(12) United States Patent
Yen

(10) Patent No.: US 11,856,280 B2
(45) Date of Patent: Dec. 26, 2023

(54) IMAGE CAPTURING MODULE

(71) Applicant: GUANGZHOU LUXVISIONS INNOVATION TECHNOLOGY LIMITED, Guangzhou (CN)

(72) Inventor: Shih-Chieh Yen, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 118 days.

(21) Appl. No.: 17/536,368

(22) Filed: Nov. 29, 2021

(65) Prior Publication Data

US 2022/0086319 A1    Mar. 17, 2022

(30) Foreign Application Priority Data

Jan. 4, 2021   (CN) .......................... 202110003486.4

(51) Int. Cl.
*H04N 23/55* (2023.01)
*G02B 3/02* (2006.01)
*G02B 5/20* (2006.01)
*H04N 25/131* (2023.01)

(52) U.S. Cl.
CPC ............... *H04N 23/55* (2023.01); *G02B 3/02* (2013.01); *G02B 5/20* (2013.01); *H04N 25/131* (2023.01)

(58) Field of Classification Search
CPC ........ H04N 23/55; H04N 25/131; G02B 3/02; G02B 5/20
See application file for complete search history.

(56) References Cited

U.S. PATENT DOCUMENTS

2021/0372856 A1*  12/2021  Kim .......................... G01J 1/46

FOREIGN PATENT DOCUMENTS

| CN | 110609386 A | 12/2019 |
|---|---|---|
| TW | 201929248 A | 7/2019 |
| TW | I696297 B | 6/2020 |

* cited by examiner

*Primary Examiner* — On S Mung
(74) *Attorney, Agent, or Firm* — Birch, Stewart, Kolasch & Birch, LLP

(57) ABSTRACT

An image capturing module includes a light filter, a meta-lens layer, and a photosensitive element. The light filter includes a light receiving surface and a light emitting surface opposite to each other. The meta-lens layer and the light filter are disposed side by side with each other. The meta-lens layer includes a light transmitting film and a plurality of microstructures. Each microstructure is arranged on the light transmitting film. The photosensitive element includes a photosensitive surface. The photosensitive surface faces to the meta-lens layer and the light emitting surface of the light filter, wherein the photosensitive surface has a plurality of pixels, and each pixel corresponds to each microstructure.

7 Claims, 7 Drawing Sheets

IMAGE CAPTURING MODULE

CROSS-REFERENCE TO RELATED APPLICATION

This non-provisional application claims priority under 35 U.S.C. § 119(a) to Patent Application No. 202110003486.4 filed in China on Jan. 4, 2021, the entire contents of which are hereby incorporated by reference.

BACKGROUND

Technical Field

The instant disclosure relates to an optical module, especially an image capturing module.

Related Art

With the rapid development of multimedia technology, many electronic products (e.g., smartphones, tablets, laptops, or digital cameras, etc.) are equipped with image capturing modules to support functions such as photography, online video, or facial recognition.

However, the lens of the currently known image capturing module is usually composed of a stack of multiple optical lenses (for example, each optical lens is a concave lens or a convex lens with a certain thickness), and the number of optical lens stacks will increase accordingly for the image capturing modules that require high image quality, resulting in the thickness and weight of the image capturing module cannot be further reduced.

SUMMARY

In view of the above, in an embodiment, an image capturing module is provided, including a light filter, a meta-lens layer, and a photosensitive element. The light filter includes the opposite light receiving surface and light emitting surface. The meta-lens layer and the light filter are disposed side by side with each other. The meta-lens layer includes a light transmitting film and a plurality of microstructures, and each microstructure is arranged on the light transmitting film. The photosensitive element includes a photosensitive surface, and the photosensitive surface faces to the meta-lens layer and the light emitting surface of the light filter, wherein the photosensitive surface has a plurality of pixels, and each pixel corresponds to each microstructure.

In sum, according to the image capturing module of the embodiment of the instant disclosure, through the photosensitive surface of the photosensitive element facing to the meta-lens layer and the light emitting surface of the light filter, and through the meta-lens layer having multiple microstructures respectively corresponding to multiple pixels of the photosensitive element, light can be guided by the multiple microstructures to respectively focus on the multiple pixels when the light passing through the light filter and the meta-lens layer, so as to sense and obtain a clear image, and the image capturing module can have no need to use optical lenses or reduce the usage number of optical lenses, so as to reduce the weight and thickness of the image capturing module and become lighter and thinner.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
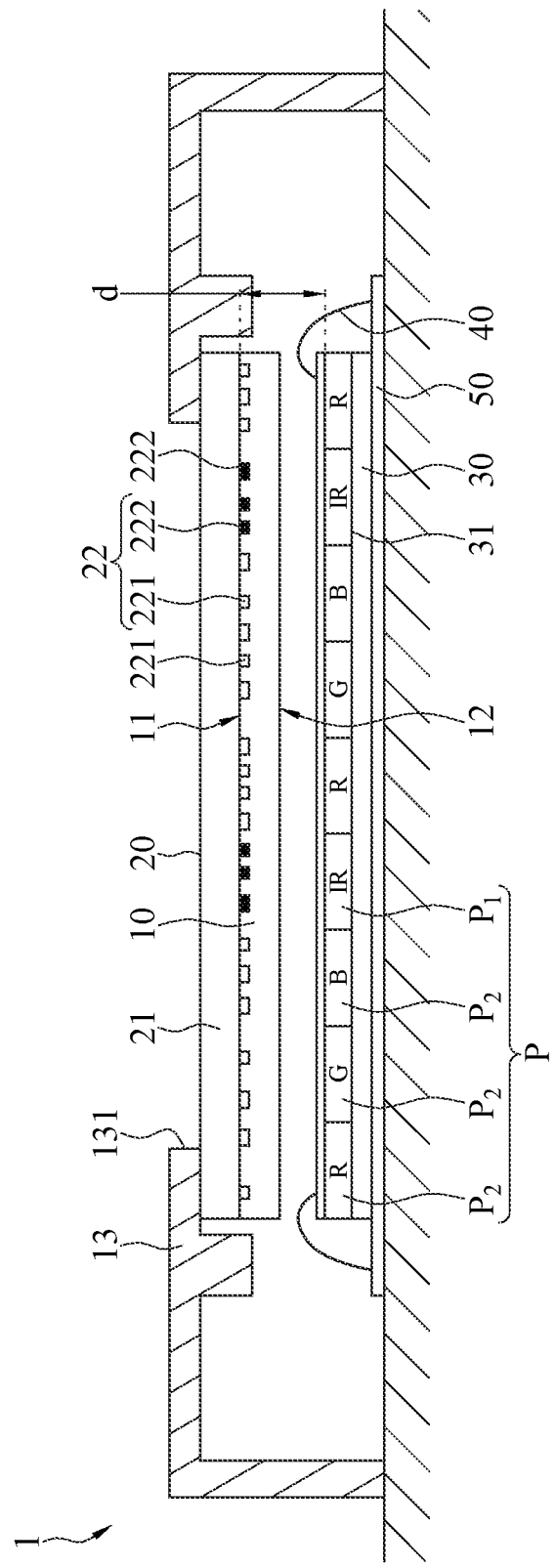
FIG. 1 illustrates a cross-sectional view of a first embodiment of the image capturing module of the instant disclosure.

The following is a detailed description of various embodiments. However, these embodiments are merely used as examples and are not intended to limit the scope of the instant disclosure. In addition, drawings in the embodiments omit some components, to clearly show technical features of the instant disclosure. Identical reference numerals in all the drawings are used to represent identical or similar components.

FIG. 1 illustrates a cross-sectional view of the first embodiment of the image capturing module of the instant disclosure. As shown in FIG. 1, the image capturing module 1 of the embodiment of the instant disclosure includes a light filter 10, a meta-lens layer 20, and a photosensitive element 30, wherein the image capturing module 1 can be applied to various electronic products (e.g., smartphones, tablets, laptops, digital cameras, or video cameras, etc.) to obtain images of objects.

Figure 2:
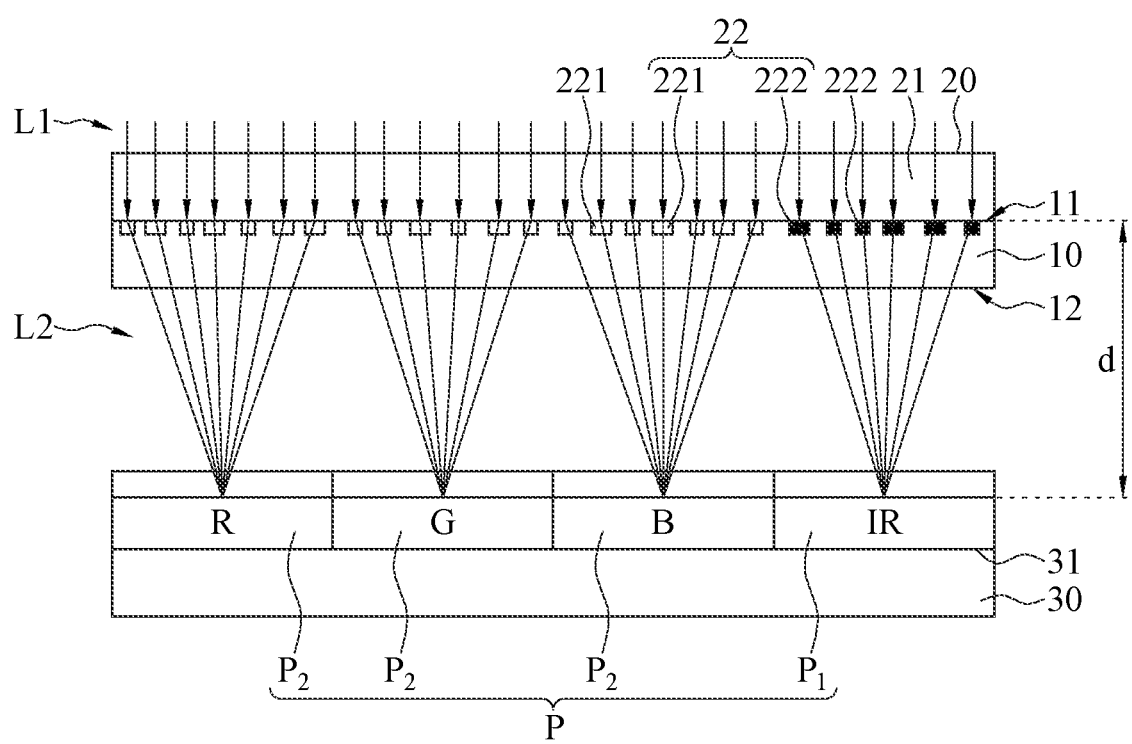
FIG. 2 illustrates a schematic diagram of the light path of the first embodiment of the image capturing module of the instant disclosure.

FIG. 2 illustrates a schematic diagram of the light path of the first embodiment of the image capturing module of the instant disclosure. As shown in FIG. 1 to FIG. 2, the light filter 10 includes the opposite light receiving surface 11 and light emitting surface 12. In some embodiments, the light filter 10 is a single-layer or multi-layer body made of light transmitting material (such as transparent plastic or glass) and can filter out unwanted light. For example, when external light (such as light L1) enters the interior of the filter 10 from the light receiving surface 11, the light filter 10 can filter out the light of the specific wavelength in the light L1 (such as ultraviolet light, infrared light, or visible light), such that the light of other wavelengths (such as light L2) can pass through the light emitting surface 12 to achieve a light filtering effect.

As shown in FIG. 1, the meta-lens layer 20 and the light filter 10 are disposed side by side with each other. The aforementioned meta-lens layer 20 includes a light transmitting film 21 and a plurality of microstructures 22, and each microstructure 22 is arranged on the light transmitting film 21. The meta-lens layer 20 can be made of metamaterials, wherein the metamaterials are artificial materials with special properties, and the meta-lens layer 20 can arbitrarily control the propagation path of light through the design or arrangement of each microstructure 22 on the light transmitting film 21.

As shown in FIG. 1, the light transmitting film 21 of the meta-lens layer 20 can be a thin film or sheet made of light transmitting material. For example, the light transmitting material may be selected from a group of dielectric materials consisting of indium tin oxide (ITO), aluminum-doped zinc oxide (Al:ZnO; AZO), Ga-doped zinc oxide (Ga:ZnO; GZO), magnesium fluoride ($MgF_2$), hafnium oxide ($HfO_2$), silicon nitride ($Si_3N_4$), silicon dioxide ($SiO_2$), and aluminum oxide ($Al_2O_3$). In some embodiments, the thickness of the light transmitting film 21 may be between 5 μm and 1000 μm. However, the light transmitting material and the thickness of the light transmitting film 21 are only for example and are not limited thereto in fact.

As shown in FIG. 1, each microstructure 22 of the meta-lens layer 20 may be an artificial structure at nanometer order, having the ability to manipulate light characteristics under a scale much smaller than the wavelength. Specifically, by changing the parameters of each microstructure 22, for example, the shape, arrangement manner to each other, size distribution, etc. of each microstructure 22, the manipulation of the mode of light travel is achieved, thereby changing the effective refractive index (Neff) of the light.

As shown in FIG. 1, the plurality of microstructures 22 may be transparent materials, such as gallium nitride (GaN), gallium phosphide (GaP), aluminum arsenide (AlAs), silicon (Si), or silicon oxide ($SiO_2$) and so on. The plurality of microstructures 22 may also be metal materials, such as aluminum, silver, copper, gold or rhodium and so on. The plurality of microstructures 22 may be formed on the light transmitting film 21 by conventional means such as etching, photolithography, nanoimprint lithography, or lithography, thus the details are not repeated here.

As shown in FIG. 1 to FIG. 2, a distance d is maintained between the photosensitive element 30 and the meta-lens layer 20. The photosensitive element 30 includes a photosensitive surface 31, and the photosensitive surface 31 faces to the light emitting surface 12 of the light filter 10, such that the light L2 emitted from the light emitting surface 12 can transmit to the photosensitive surface 31 of the photosensitive element 30. For example, as shown in FIG. 1, in this embodiment, the image capturing module 1 has a circular support 13 and a circuit board 50. The circular support 13 has a central through hole 131. The light filter 10 and the meta-lens layer 20 are fixed to the circular support 13 and correspond to the central through hole 131. The circuit board 50 is located in the circular support 13. The photosensitive element 30 is fixed on the circuit board 50 and does not contact the light filter 10 and meta-lens layer 20, such that the photosensitive element 30 and the meta-lens layer 20 are kept at a distance d. Furthermore, the photosensitive element 30 is electrically connected to the circuit board 50 through a wire 40. Therefore, after the photosensitive surface 31 of the photosensitive element 30 has received the light and converted the light signal into an electrical signal, the photosensitive element 30 can transmit the electrical signal to the circuit board 50 to store image information.

In some embodiments, the photosensitive element 30 may be a charge-coupled device (CCD), a complementary metal-oxide semiconductor (CMOS), or a CMOS active pixel sensor. In this embodiment, the photosensitive surface 31 of the photosensitive element 30 has a plurality of pixels P configured to sensitize to obtain images, and the plurality of pixels P respectively correspond to the plurality of microstructures 22. For example, when a pixel P is a visible light sensing pixel, a microstructure 22 can be designed corresponding to the visible light sensing pixel, such that external light can be guided by the microstructure 22 to focus on the visible light sensing pixel during the process of passing through the meta-lens layer 20, or when a pixel P is an infrared light sensing pixel, a microstructure 22 can be designed corresponding to the infrared light sensing pixel, such that external light can be guided by the microstructure 22 to focus on the infrared light sensing pixel during the process of passing through the meta-lens layer 20.

In sum, according to the image capturing module 1 of the embodiments of the instant disclosure, through the photosensitive surface 31 of the photosensitive element 30 facing to the meta-lens layer 20 and the light emitting surface 12 of the light filter 10, and through the meta-lens layer 20 having multiple microstructures 22 respectively corresponding to multiple pixels P of the photosensitive element 30, external light can be guided by the multiple microstructures 22 to focus on the multiple pixels P when the external light passing through the light filter 10 and the meta-lens layer 20, so as to sense and obtain a clear image, and the image capturing module 1 can have no need to use optical lenses or reduce the usage number of optical lenses, so as to reduce the weight and thickness of the image capturing module 1 and become lighter and thinner.

In some embodiments, the photosensitive element 30 may be an RGB-IR photosensitive element, an RGB photosensitive element, or IR photosensitive element. The multiple microstructures 22 of the meta-lens layer 20 can be designed according to different types of the photosensitive element 30, which are respectively described in conjunction with the drawing as follows. As shown in FIG. 1 to FIG. 2, in the first embodiment, the light filter 10 of the image capturing module 1 is located between the meta-lens layer 20 and the photosensitive surface 31 of the photosensitive element 30. For example, the photosensitive element 30 of the image capturing module 1 could be an RGB-IR photosensitive element. The photosensitive surface 31 of the photosensitive element 30 has multiple pixels P. The multiple pixels P include multiple visible light sensing pixels $P_2$ and multiple infrared light sensing pixels $P_1$. The multiple visible light sensing pixels $P_2$ include multiple red sensing pixels R, multiple green sensing pixels G, and multiple blue sensing pixels B. The meta-lens layer 20 of the image capturing module is joined between the light filter 10 and the circular support 13. The multiple microstructures 22 of the meta-lens layer 20 include at least one first microstructure 221 and at least one second microstructure 222. In this embodiment, the multiple microstructures 22 include multiple first microstructures 221 and multiple second microstructures 222. The multiple first microstructures 221 respectively correspond to the multiple visible light sensing pixels $P_2$. The multiple second microstructures 222 respectively correspond to the multiple infrared light sensing pixels $P_1$. Each first microstructure 221 is different from each second microstructure 222. Furthermore, each of the first microstructures 221 may be the same or different from each other.

For example, in this embodiment, since the wavelengths of infrared light and visible light are different and focus positions are also different, through different microstructures 22 of the meta-lens layer 20 (such as multiple first microstructures 221 and multiple second microstructures 222), wherein the structures, shapes, or arrangements of the multiple first microstructures 221 are designed corresponding to the infrared light, and the structures, shapes, or arrangements of the multiple second microstructures 222 are designed corresponding to the visible light, such that the infrared light and the visible light are respectively guided by the multiple first microstructures 221 and multiple second microstructures 222 to respectively focus on each visible light sensing pixel $P_2$ and each infrared light sensing pixel $P_1$, avoiding the image capturing module 1 emerging the phase delay problem.

Please again refer to FIG. 2. Specifically, when external light L1 enters the meta-lens layer 20 and passes through the light transmitting film 21 and each microstructure 22 of the meta-lens layer 20, the external light L1 can be guided by the multiple first microstructures 221 and multiple second microstructures 222 to converge along the direction from the light receiving surface 11 of the light filter 10 toward the light emitting surface 12 (such as light L2), and finally, respectively focus on each visible light sensing pixel $P_2$ and each infrared light sensing pixel $P_1$, since each first microstructure 221 and each second microstructure 222 respectively correspond to each visible light sensing pixel $P_2$ and each infrared light sensing pixel $P_1$ (e.g., the shape and arrangement of each first microstructure 221 correspond to each visible light sensing pixel $P_2$, and the shape and arrangement of each second microstructure 222 correspond to each infrared light sensing pixel $P_1$).

Figure 3:
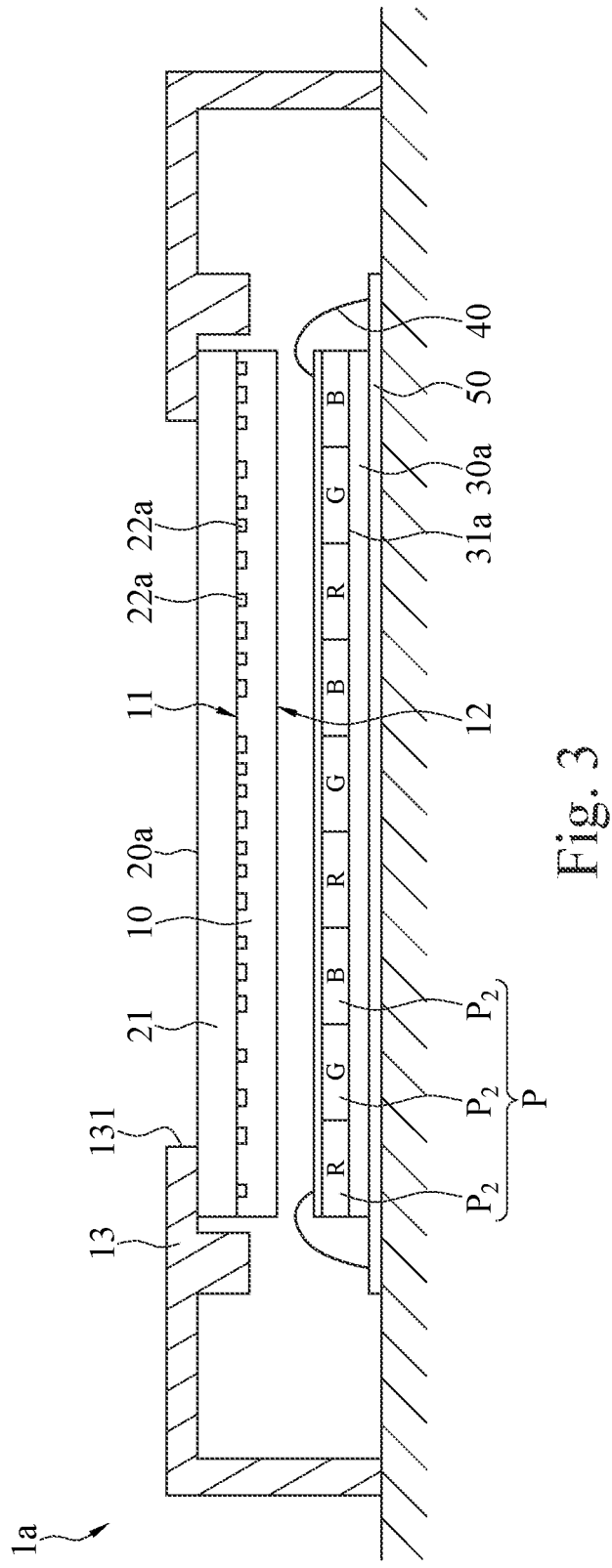
FIG. 3 illustrates a cross-sectional view of a second embodiment of the image capturing module of the instant disclosure.
Figure 4:
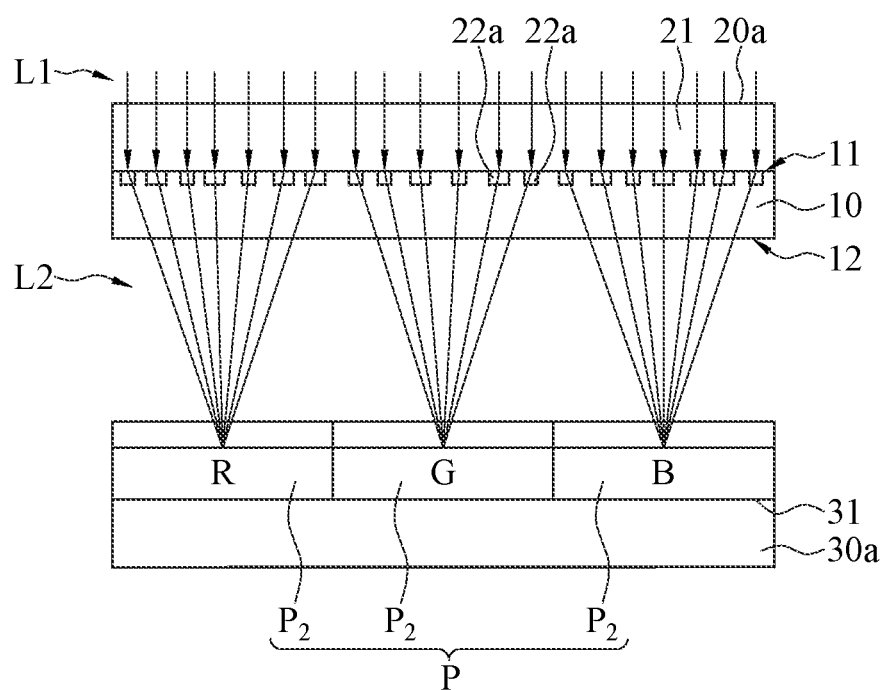
FIG. 4 illustrates a schematic diagram of the light path of the second embodiment of the image capturing module of the instant disclosure.

FIG. 3 illustrates a cross-sectional view of a second embodiment of the image capturing module of the instant disclosure, and FIG. 4 illustrates a schematic diagram of the light path of the second embodiment of the image capturing module of the instant disclosure. Please refer to FIG. 3 and FIG. 4. The difference between the second embodiment and the first embodiment is that the photosensitive element 30*a* of the image capturing module 1*a* is an RGB photosensitive element in the second embodiment. The multiple pixels P on the photosensitive surface 31*a* of the photosensitive element 30*a* include multiple visible light sensing pixels $P_2$. The structures, arrangements, or shapes of the multiple microstructures 22*a* of the meta-lens layer 20*a* may be similar to the structures, arrangements, or shapes of the multiple first microstructures 221 described above. Therefore, when external light L1 enters the meta-lens layer 20*a* and passes through the light transmitting film 21 and each microstructure 22*a* of the meta-lens layer 20*a*, the external light L1 can be guided by the multiple microstructures 22*a* to converge along the direction from the light receiving surface 11 of the light filter 10 toward the light emitting surface 12 (such as light L2), and finally, respectively focus on each visible light sensing pixel $P_2$, since each microstructure 22*a* corresponds to each visible light sensing pixel $P_2$.

As mentioned above, in some embodiments, the photosensitive element 30*a* may also be an IR photosensitive element. The multiple pixels P on the photosensitive surface 31*a* of the photosensitive element 30*a* include multiple infrared light sensing pixels $P_1$, and the structures, arrangements, or shapes of the multiple microstructures 22*a* of the meta-lens layer 20*a* may be similar to the structures, arrangements, or shapes of the multiple second microstructures 222 described above. Therefore, when external light L1 enters the meta-lens layer 20*a* and passes through the light transmitting film 21 and each microstructure 22*a* of the meta-lens layer 20*a*, the external light L1 can be guided by the multiple microstructures 22*a* to converge along the direction from the light receiving surface 11 of the light filter 10 toward the light emitting surface 12, and finally, respectively focus on each infrared light sensing pixels $P_1$, since each microstructure 22*a* corresponds to infrared light sensing pixels $P_1$.

Figure 5:
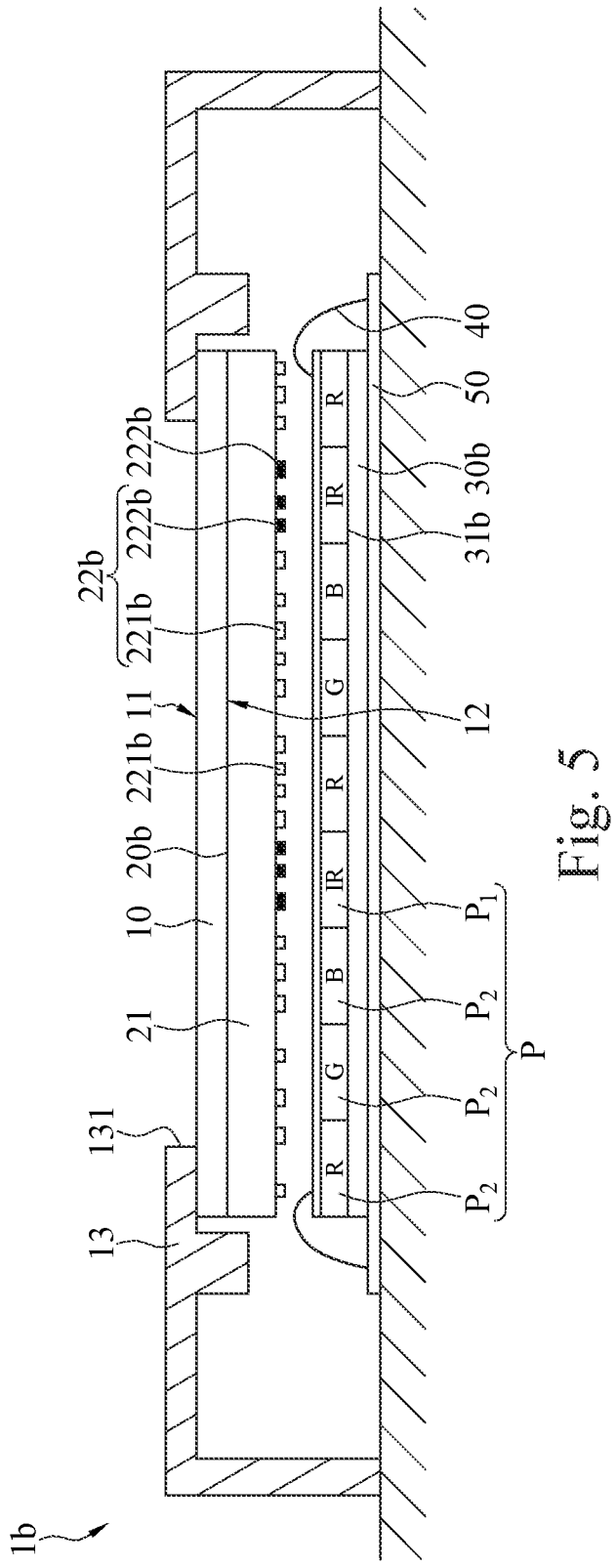
FIG. 5 illustrates a cross-sectional view of a third embodiment of the image capturing module of the instant disclosure.

FIG. 5 illustrates a cross-sectional view of a third embodiment of the image capturing module of the instant disclosure. In the third embodiment, the arrangement order of the meta-lens layer 20*b* and light filter 10 is different from that of the first embodiment. As shown in FIG. 5, in this embodiment, the meta-lens layer 20*b* of the image capturing module 1*b* is located between the light emitting surface 12 of the light filter 10 and the photosensitive surface 31*b* of the photosensitive element 30*b*. Therefore, each first microstructure 221*b* and each second microstructure 222*b* of the multiple microstructures 22*b* on the meta-lens layer 20*b* of this embodiment are different from each first microstructure 221 and each second microstructure 222 of the multiple microstructures 22 on the meta-lens layer 20 of the first embodiment.

As mentioned above, in this embodiment, for example, since external light passes through light filter 10 before passing through the meta-lens layer 20*b*, the travel path of the light is different from that of the first embodiment. Therefore, the structures, arrangements, or shapes of each first microstructure 221*b* and each second microstructure 222*b* of this embodiment are different from each first microstructure 221 and each second microstructure 222 of the first embodiment, such that each first microstructure 221*b* and each second microstructure 222*b* respectively correspond to each visible light sensing pixel $P_2$ and each infrared light sensing pixel $P_1$, thereby the external light can be guided by the multiple first microstructures 221*b* and multiple second microstructures 222*b* to respectively converge along the direction from the meta-lens layer 20*b* toward each pixel P, and finally, respectively focus on each visible light sensing pixel $P_2$ and each infrared light sensing pixel $P_1$.

As mentioned above, as in the second embodiment, the photosensitive element 30*b* may also be an RGB photosensitive element or an IR photosensitive element in the third embodiment, and the external light can respectively focus on each visible light sensing pixel $P_2$ or each infrared light sensing pixel $P_1$ through the different configuration of microstructures 22*b*.

The prior art often requires multiple optical lenses to focus external light on multiple pixels on the photosensitive element to sense and obtain a clear image. According to the image capturing module 1/1*a*/1*b*, through the meta-lens layer 20/20*a*/20*b* having multiple microstructures 22/22*a*/22*b* respectively corresponding to multiple pixels P of photosensitive element 30/30*a*/30*b*, external light can be guided by the multiple microstructures 22/22*a*/22*b* to respectively focus on the multiple pixels P when the external light passing through the light filter 10 and the meta-lens layer 20/20*a*/20*b*, so as to sense and obtain a clear image. Therefore, the image capturing module 1/1*a*/1*b* can have no need to use optical lenses to reduce the weight and thickness of the image capturing module 1/1*a*/1*b* and become lighter and thinner.

Figure 6:
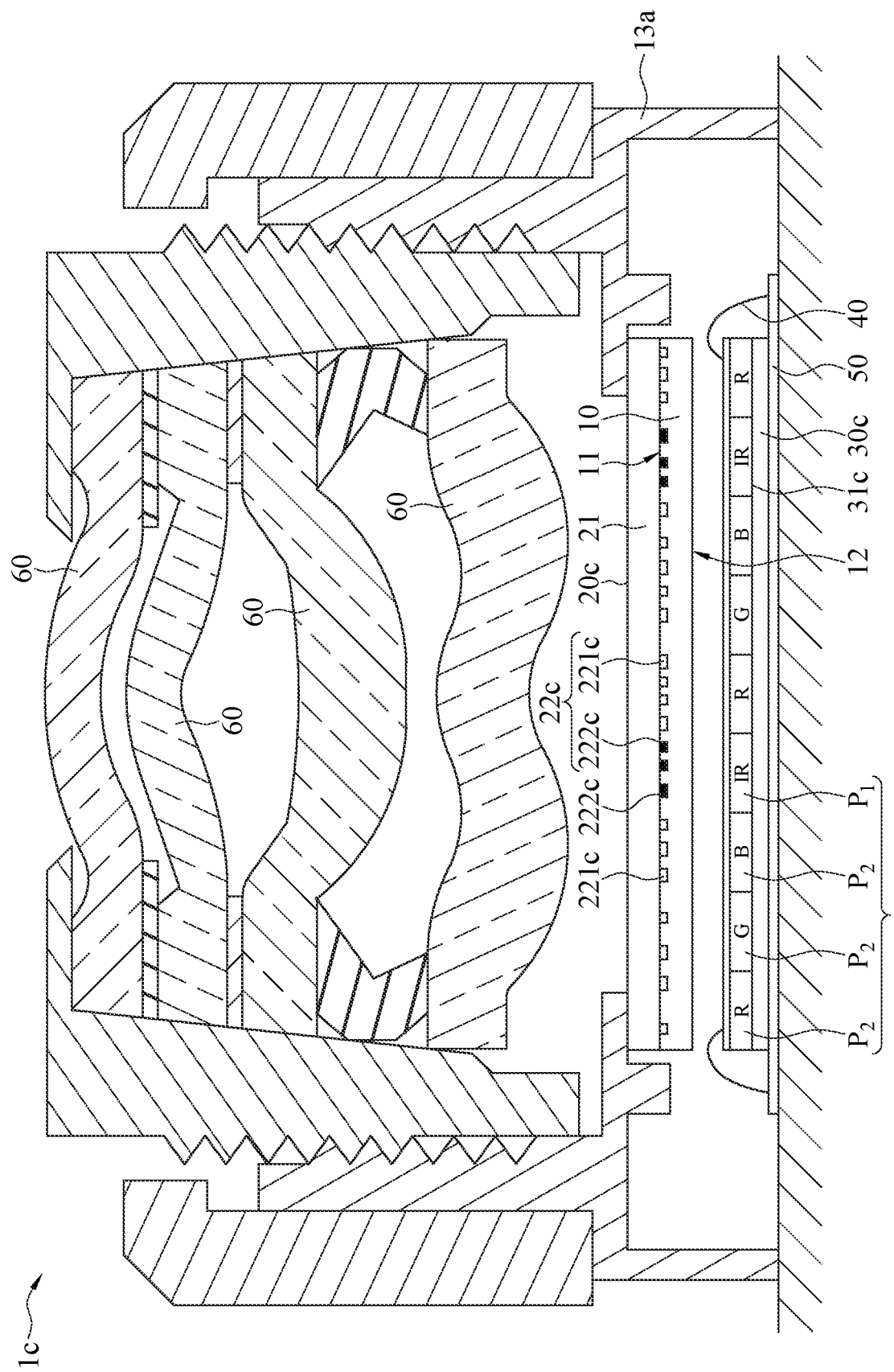
FIG. 6 illustrates a cross-sectional view of a fourth embodiment of the image capturing module of the instant disclosure.

In some embodiments, the aforementioned embodiments may also be used with general optical lenses, as shown in FIG. 6, wherein FIG. 6 illustrates a cross-sectional view of a fourth embodiment of the image capturing module of the instant disclosure. In this embodiment, the image capturing module 1*c* further includes at least one lens 60. The light filter 10 and the meta-lens layer 20*c* of the image capturing module 1*c* are located between the at least one lens 60 and the photosensitive element 30*c*. For example, in the fourth embodiment, the light filter 10 of the image capturing module 1*c* is located between the meta-lens layer 20*c* and the photosensitive surface 31*c* of the photosensitive element 30*c*, and the meta-lens layer 20*c* is located between the light receiving surface 11 of the light filter 10 and the at least one lens 60.

As mentioned above, for example, the image capturing module 1*c* has a circular support 13*a*, multiple lenses 60 arranged side by side (here are four lenses 60, but this is not limited thereto), and a circuit board 50. For example, in this embodiment, four lenses 60 are fixed to the circular support 13a through threads and are arranged side by side with the meta-lens layer 20c. Compared with the aforementioned first embodiment, since this embodiment is further equipped with multiple lenses 60, each first microstructure 221c and each second microstructure 222c of multiple microstructures 22c on the meta-lens layer 20c of this embodiment are different from each first microstructure 221 and each second microstructure 222 of multiple microstructures 22 on the meta-lens layer 20 of the first embodiment.

As mentioned above, for example, in this embodiment, since external light passes through multiple lenses 60 before passing through the meta-lens layer 20c, the travel path of the light is different from that of the first embodiment. Therefore, the structures, arrangements, or shapes of each first microstructure 221c and each second microstructure 222c of this embodiment are different from each first microstructure 221 and each second microstructure 222 of the first embodiment, such that each first microstructure 221c and each second microstructure 222c respectively correspond to each visible light sensing pixel $P_2$ and each infrared light sensing pixel $P_1$, thereby the external light can be guided by the multiple first microstructures 221c and multiple second microstructures 222c to respectively converge along the direction from the light receiving surface 11 of the light filter 10 toward the light emitting surface 12, and finally, respectively focus on each visible light sensing pixel $P_2$ and each infrared light sensing pixel $P_1$.

As mentioned above, in other embodiments, the photosensitive element 30c may also be an RGB photosensitive element or an IR photosensitive element, and the external light can respectively focus on each visible light sensing pixel $P_2$ or each infrared light sensing pixel $P_1$ through the different configuration of microstructures 22c, thus the details are not repeated here.

Figure 7:
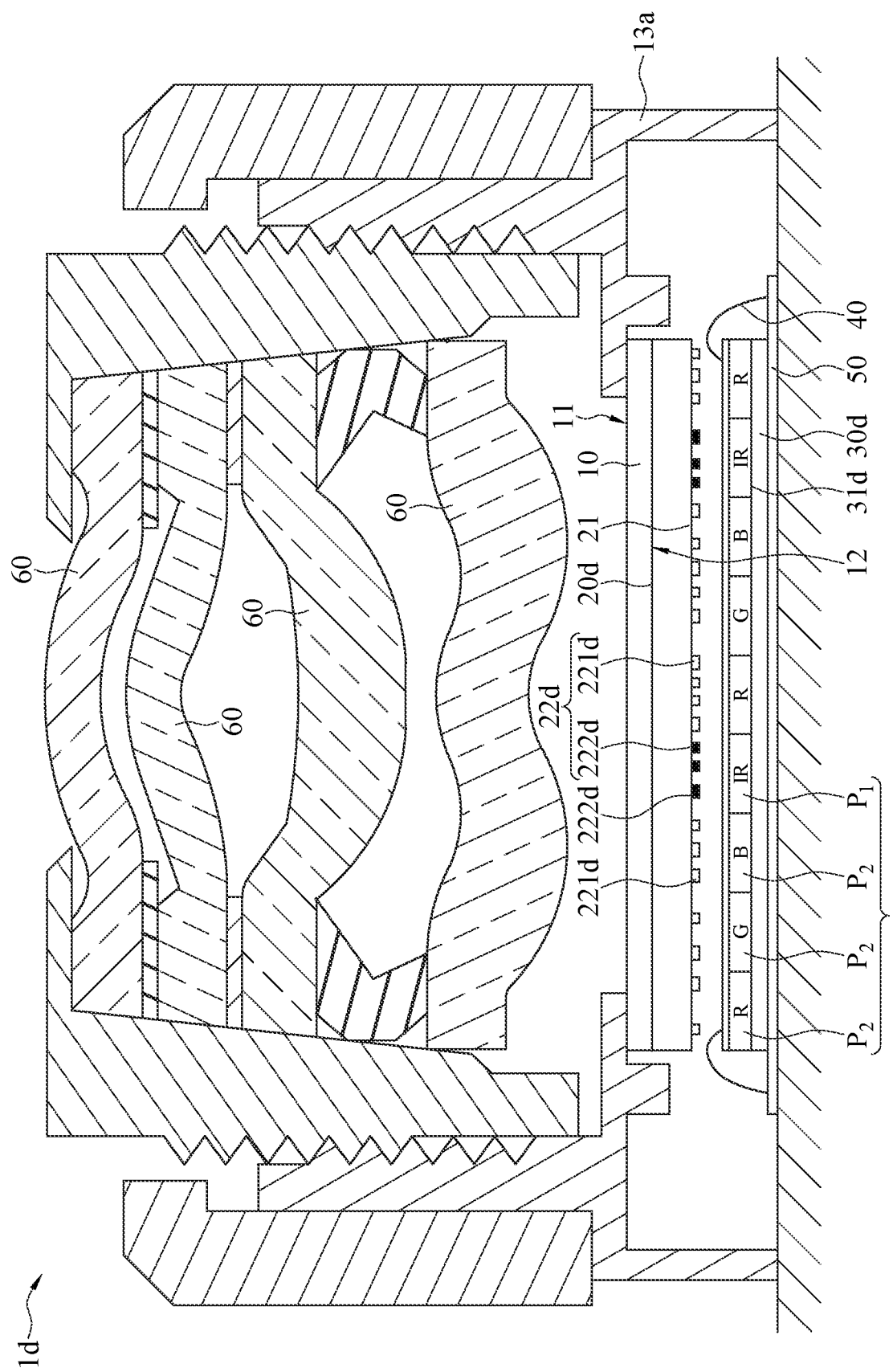
FIG. 7 illustrates a cross-sectional view of a fifth embodiment of the image capturing module of the instant disclosure.

FIG. 7 illustrates a cross-sectional view of a fifth embodiment of the image capturing module of the instant disclosure. Please refer to FIG. 7. In the fifth embodiment, the arrangement order of the meta-lens layer 20d and light filter 10 is different from that of the fourth embodiment. As shown in FIG. 7, in this embodiment, the meta-lens layer 20d of the image capturing module 1d is located between the light emitting surface 12 of the light filter 10 and the photosensitive surface 31d of the photosensitive element 30d. Therefore, each first microstructure 221d and each second microstructure 222d of the multiple microstructures 22d on the meta-lens layer 20d of this embodiment are different from each first microstructure 221c and each second microstructure 222c of the multiple microstructures 22c on the meta-lens layer 20c of the fourth embodiment.

As mentioned above, in this embodiment, for example, since external light passes through multiple lenses 60 and then passes through the light filter 10 before passing through the meta-lens layer 20d, the travel path of the light is different from that of the fourth embodiment. Therefore, the structures, arrangements, or shapes of each first microstructure 221d and each second microstructure 222d of this embodiment are different from each first microstructure 221c and each second microstructure 222c of the fourth embodiment, such that each first microstructure 221d and each second microstructure 222d respectively correspond to each visible light sensing pixel $P_2$ and each infrared light sensing pixel $P_1$, thereby the external light can be guided by the multiple first microstructures 221d and multiple second microstructures 222d to respectively converge along the direction from the meta-lens layer 20d toward each pixel P, and finally, respectively focus on each visible light sensing pixel $P_2$ and each infrared light sensing pixel $P_1$. As in the fourth embodiment, the photosensitive element 30d may also be an RGB photosensitive element or an IR photosensitive element in the fifth embodiment, and the external light can respectively focus on each visible light sensing pixel $P_2$ or each infrared light sensing pixel $P_1$ through the different configuration of microstructures 22d.

According to the image capturing module 1c/1d, through the meta-lens layer 20c/20d having multiple microstructures 22c/22d respectively corresponding to multiple pixels P of photosensitive element 30c/30d, external light can be guided by the multiple microstructures 22c/22d to respectively focus on the multiple pixels P when the external light passing through the light filter 10 and the meta-lens layer 20c/20d, so as to sense and obtain a clear image. Therefore, the image capturing module 1c/1d can reduce the usage number of optical lenses 60 to reduce the weight and thickness of the image capturing module 1c/1s and become lighter and thinner. For example, an image capturing module fabricated by the prior art requires multiple optical lenses to achieve high-quality image level. The image capturing module 1c/1d of the embodiments of the instant disclosure can reduce part of the usage number of optical lenses used in the prior art by the meta-lens layer 20c/20d, such that the image capturing module 1c/1d still can achieve the requirement of capturing high-quality images while reducing the number of optical lenses.

What is claimed is:

1. An image capturing module, comprising:
a light filter, comprising a light receiving surface and a light emitting surface opposite to each other;
a meta-lens layer, disposed side by side with the light filter, wherein the meta-lens layer comprises a light transmitting film and a plurality of microstructures, and the plurality of microstructures are arranged on the light transmitting film; and
a photosensitive element, comprising a photosensitive surface, the photosensitive surface faces to the meta-lens layer and the light emitting surface of the light filter, wherein
the plurality of pixels comprise a visible light sensing pixel and an infrared light sensing pixel;
the photosensitive surface has a plurality of pixels, the plurality of pixels respectively correspond to the plurality of microstructures;
the plurality of microstructures of the meta-lens layer comprise a first microstructure and a second microstructure, the first microstructure corresponds to the visible light sensing pixel, the second microstructure corresponds to the infrared light sensing pixel, and the first microstructure is different from the second microstructure; and
when an external light enters the light transmitting film of the meta-lens layer, the external light focuses on the visible light sensing pixel through the first microstructure and focuses on the infrared light sensing pixel through the second microstructure.

2. The image capturing module according to claim 1, wherein the light filter comprises a visible light filter, an infrared light filter, or a combination thereof.

3. The image capturing module according to claim 1, wherein the meta-lens layer is located between the light emitting surface of the light filter and the photosensitive surface of the photosensitive element.

4. The image capturing module according to claim 1, wherein the light filter is located between the meta-lens layer and the photosensitive surface of the photosensitive element.

5. The image capturing module according to claim 1, further comprising at least one lens, wherein the light filter and the meta-lens layer are located between the at least one lens and the photosensitive element, and the at least one lens corresponds to the photosensitive element.

6. The image capturing module according to claim 5, wherein the meta-lens layer is located between the light receiving surface of the light filter and the at least one lens.

7. The image capturing module according to claim 1, wherein a distance is maintained between the meta-lens layer and the photosensitive element.

* * * * *